(12) United States Patent
Damke et al.

(10) Patent No.: US 11,306,109 B2
(45) Date of Patent: Apr. 19, 2022

(54) METHOD FOR PREPARING SILICON-CONTAINING HETEROCYCLES

(71) Applicant: Henkel AG & Co. KGaA, Duesseldorf (DE)

(72) Inventors: Jan-Erik Damke, Duesseldorf (DE); Johann Klein, Duesseldorf (DE); Esteban Mejia, Rostock (DE); Rok Brisar, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/745,609

(22) Filed: Jan. 17, 2020

(65) Prior Publication Data

US 2020/0148708 A1    May 14, 2020

Related U.S. Application Data

(63) Continuation of application No. PCT/EP2018/053739, filed on Feb. 15, 2018.

(30) Foreign Application Priority Data

Jul. 21, 2017  (EP) .................................... 17182575

(51) Int. Cl.
C07F 7/18    (2006.01)
(52) U.S. Cl.
CPC .................. C07F 7/1876 (2013.01)
(58) Field of Classification Search
None
See application file for complete search history.

(56) References Cited

U.S. PATENT DOCUMENTS 4,794,192 A    12/1988  Stein
4,855,351 A    8/1989   Stein

FOREIGN PATENT DOCUMENTS

| JP | 2014001152 A | 1/2014 |
| JP | 2016040233 A | 3/2016 |
| KR | 20170067690 A | 6/2017 |
| SU | 1143748 A1 | 3/1985 |

OTHER PUBLICATIONS

Rossmy and Koerner, Die Makromolekulare Chemie, 1964, 73, pp. 85-108.
Chvalovsky and El-Hamouly, Tetrahedron, 1983, 39, pp. 1195-1197.
International Search Report for International PCT Patent Application No. PCT/EP2018/053739 dated Apr. 16, 2018.
Die Makromolekulare Chemie 97, 1966, pp. 241-247.
Tanino et al., The Journal of Organic Chemistry, 1997, 62, pp. 4206-4207.
Bear et al., The Journal of Organic Chemistry, 2002, 67, pp. 2056-2064.

*Primary Examiner* — Clinton A Brooks
(74) *Attorney, Agent, or Firm* — James E. Piotrowski

(57) ABSTRACT

The present invention relates to a method for preparing silicon-containing heterocycles of the general formula (I)

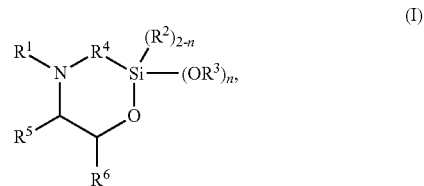

(I)

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;
$R^4$ is selected from a linear or branched $C_1$-$C_{20}$ alkylene residue which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, and a $C_4$-$C_8$ cycloalkyl, or $R^5$ and $R^6$ may form a ring, a 4- to 8-membered alkyl ring; and
n is 0, 1 or 2, 2,
said method comprising a one-step reaction of at least one epoxide compound of the general formula (II) and at least one aminoalkoxysilane having a primary amino group in the presence of a catalyst

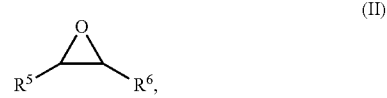

(II)

wherein $R^5$ and $R^6$ are the same as defined for the general formula (I) above; as well as the use of the silicon-containing heterocycles of the general formula (I).

12 Claims, No Drawings

METHOD FOR PREPARING SILICON-CONTAINING HETEROCYCLES

TECHNICAL FIELD

The present invention relates to a method for preparing silicon-containing heterocycles of the general formula (I) as defined herein by reacting at least one aminoalkoxysilane and at least one epoxide in the presence of a catalyst in a one-step reaction. In addition, the present invention relates to the use of the obtained silicon-containing heterocycles.

BACKGROUND OF THE INVENTION

One of the most popular alkoxysilane systems for moisture-curable compositions is aminoalkyltrimethoxysilane in the presence of a Lewis acid catalyst. However, during hydrolysis a large amount of methanol is produced, which is toxic and therefore undesirable in everyday consumer applications. In the last years a considerable attention has been directed to the reduction of the amount of alcohol expelled during the curing process.

The alkoxy adducts of cyclic silanes having one alkoxide residue may lead to up to 33% less expelled alcohol compared to aminoalkyltrimethoxysilane.

Some siloxacycloalkenes are disclosed in Rossmy and Koerner (*Die Makromolekulare Chemie*, 1964, 73, 85-108 and *Die Makromolekulare Chemie*, 1966, 97, 241-247), Kuwajima et al (Tanino, K.; Yoshitani, N.; Moriyama, F.; Kuwajima, I.; *The Journal of Organic Chemistry*, 1997, 62, 4206-4207) and Woerpel et al. (Bear T. J., Shaw J. T., Woerpel K. A., *The Journal of Organic Chemistry*, 2002, 67, 2056-2064).

Chvalovsky and El-Hamouly (*Tetrahedron*, 1983, 39, 1195-1197) discloses the preparation of 7- and 8-membered siloxacycloalkenes by hydosilylation of allylalkylsilanes on to alkoxysilane and later decomposing the disilane product to methylalkoxysilane and siloxacycloalkene in the presence of sodium ethoxide or hydroxide. This approach requires an expensive platinum catalyst for the hydrosilylation reaction and produces methylalkoxysilane during cyclization. In addition, a polymer is formed during the reaction, therefore distillation is needed to obtain a clean product.

U.S. Pat. Nos. 4,794,192 and 4,855,351 disclose the preparation of silicon-containing heterocycles by heating a mixture of glycidyl ethers with aminoalkoxysilanes under reflux.

JP 2014001152 discloses the preparation of a silane coupling agent for surface treatment applications. It is prepared by ring opening of epoxides in a two-step reaction. In the first step an aminosilane and an epoxide are reacted at high temperature to yield an alcohol. In the second step a dealcoholization reaction is induced by in situ removal of the produced alcohol in the presence of a basic catalyst. The described reaction synthesis results in 30-40% yield, suggesting poor reaction selectivity. The catalyst is usually not removed after the reaction, which can interfere with the curing catalyst used in adhesive formulations later on.

Therefore, a need still exists in the art for improved methods for synthesizing silicon-containing heterocycles which overcome at least some of drawbacks of the known systems.

SUMMARY OF THE INVENTION

The object of the present invention is therefore to provide a method for preparing silicon-containing heterocycles which solves some of the known issues, allowing the production of the silicon-containing heterocycles in a one-step reaction at mild conditions.

The above-defined method has been found to produce the silicon-containing heterocycles of the general formula (I) at high yields in a one-step reaction at mild conditions. The method according to the present invention is more energy-efficient due to the low reaction temperature required. It also results in higher selectivity, decreasing the amount of produced waste and simplifying the purification of the product.

The present invention provides a method for preparing a silicon-containing heterocycle of the general formula (I)

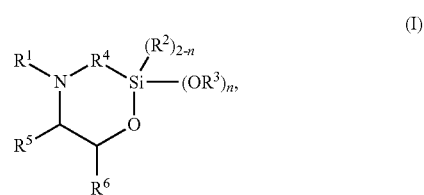

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue, selected from a $C_1$-$C_8$ alkyl residue, more a methyl, ethyl or propyl residue, which may be interrupted by at least one heteroatom;
$R^4$ is selected from a linear or branched, substituted or unsubstituted $C_1$-$C_{20}$ alkylene residue, a $C_1$-$C_8$ alkylene, more a methylene, ethylene, 1,3-propylene, 2-methyl-1,3-propylene, or 1,4-butylene residue, most a methylene or 1,3-propylene residue, which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl, $C_1$-$C_8$ alkyl residue or a phenyl residue, which may be interrupted by at least one heteroatom, and a $C_4$-$C_8$ cycloalkyl, or $R^5$ and $R^6$ may form a ring, a 4- to 8-membered alkyl ring, more preferably a 5- or 6-membered alkyl ring; and
n is 0, 1 or 2, 2,
said method comprising a one-step reaction of at least one epoxide compound of the general formula (II) and at least one aminoalkoxysilane having a primary amino group in the presence of a catalyst

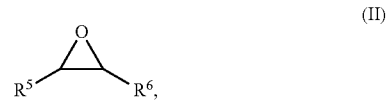

wherein $R^5$ and $R^6$ are the same as defined for the general formula (I) above.

The present invention also relates to use of the silicon-containing heterocycle of the general formula (I) obtained by the method according to the present invention as an adhesion promoter, urethane coupling agent, end-capping agent for moisture curable compositions, surface treatment agent, water scavenger, fiber treatment agent, paint additive, and/or a monomer for polymer preparations, preferably as an end-capping agent for moisture curable compositions.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

The term "at least one," as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

As used herein, the singular forms "a", "an" and "the" include both singular and plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps.

The recitation of numerical end points includes all numbers and fractions subsumed within the respective ranges, as well as the recited end points.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The terms "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, "$C_1$-$C_{20}$ alkyl" or "$C_1$-$C_8$ alkyl" residue refers to a monovalent group that contains from 1 to 20 or from 1 to 8 carbons atoms, that is a radical of an alkane and includes linear and branched organic groups. Examples of alkyl residues include, but are not limited to: methyl; ethyl; propyl (or n-propyl); isopropyl; n-butyl; isobutyl; sec-butyl; tert-butyl; n-pentyl; n-hexyl; n-heptyl; and, 2-ethylhexyl. In the present invention, such alkyl residues may be unsubstituted or may be substituted with one or more substituents such as halo, preferably fluoro, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above may, in particular, be mentioned as examples of suitable substituted alkyl residues. In general, unsubstituted alkyl residues containing from 1 to 6 carbon atoms ($C_1$-$C_6$ alkyl) and unsubstituted alkyl residues containing from 1 to 4 carbon atoms ($C_1$-$C_4$ alkyl) are preferred.

The term "$C_4$-$C_8$ cycloalkyl" is understood to mean a saturated, mono- or bicyclic hydrocarbon residue having from 4 to 8 carbon atoms. Examples of cycloalkyl residues include, but are not limited to: cyclopropyl; cyclobutyl; cyclopentyl; cyclohexyl; cycloheptyl; cyclooctyl; and norbornane.

As used herein, an "$C_6$-$C_{18}$ aryl" residue is used alone or as part of a larger moiety—as in "aralkyl residue"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl residues include, but are not limited to: phenyl; indenyl; naphthalenyl, tetrahydronaphthyl, tetrahydroindenyl; tetrahydroanthracenyl; and, anthracenyl. A phenyl residue is preferred.

The term "$C_1$-$C_{20}$ alkylene" or "$C_1$-$C_8$ alkylene" residue refers to a divalent group that contains from 1 to 20 or 1 to 8 carbon atoms, that is a radical of an alkane and includes linear, branched organic or cyclic groups, which groups may be unsubstituted or substituted and may optionally be interrupted by at least one heteroatom.

Where mentioned, the expression "interrupted by at least one heteroatom" means that the main chain of a residue comprises, as a chain member, at least one atom that differs from carbon atom, preferably selected from oxygen, sulfur, or nitrogen.

In a first aspect, the present invention provides a method for preparing a silicon-containing heterocycle of the general formula (I)

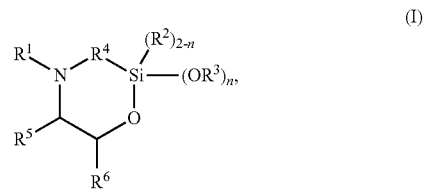

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue, preferably selected from a $C_1$-$C_8$ alkyl residue, more preferably a methyl, ethyl or propyl residue, which may be interrupted by at least one heteroatom;
$R^4$ is selected from a linear or branched, substituted or unsubstituted $C_1$-$C_{20}$ alkylene residue, preferably a $C_1$-$C_8$ alkylene, more preferably a methylene, ethylene, 1,3-propylene, 2-methyl-1,3-propylene, or 1,4-butylene residue, most preferably a methylene or 1,3-propylene residue, which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl, preferably $C_1$-$C_8$ alkyl residue or a phenyl residue, which may be interrupted by at least one heteroatom, and a $C_4$-$C_8$ cycloalkyl, or $R^5$ and $R^6$ may form a ring, preferably a 4- to 8-membered alkyl ring, more preferably a 4- to 8-membered alkyl ring, more preferably 5- or 6-membered alkyl ring; and
n is 0, 1 or 2, preferably 2,
said method comprising a one-step reaction of at least one epoxide compound of the general formula (II) and at least one aminoalkoxysilane having a primary amino group in the presence of a catalyst

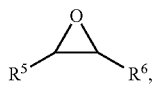

(II)

wherein $R^5$ and $R^6$ are the same as defined for the general formula (I) above.

In preferred embodiments, in the general formula (I), $R^1$ is hydrogen; $R^2$ is selected from a linear or branched, substituted or unsubstituted $C_1$-$C_8$ alkyl residue; $R^3$ is selected from a linear or branched, substituted or unsubstituted $C_1$-$C_8$ alkyl residue; $R^4$ is selected from a linear or branched, substituted or unsubstituted $C_1$-$C_8$ alkylene residue; and/or $R^5$ is selected from hydrogen and a linear or branched, substituted or unsubstituted $C_1$-$C_8$ alkyl residue while $R^6$ is selected from a linear or branched, substituted or unsubstituted $C_1$-$C_8$ alkyl residue or a phenyl, or $R^5$ and $R^6$ form a 4- to 8-membered alkyl ring, in particular a 5- or 6-membered alkyl ring.

More preferably, in the general formula (I), n is 2; $R^1$ is hydrogen; $R^3$ is selected from a methyl, ethyl or propyl residue, most preferably a methyl residue; $R^4$ is selected from a methylene, ethylene, 1,3-propylene, 2-methyl-1,3-propylene, or 1,4-butylene residue, more preferably a methylene or 1,3-propylene residue, most preferably a 1,3-propylene residue; $R^5$ is hydrogen; and/or $R^6$ is selected from a linear or branched, substituted or unsubstituted $C_1$-$C_8$ alkyl residue or phenyl residue, or $R^5$ and $R^6$ form a 5- or 6-membered alkyl ring.

Examples of the epoxide of the general formula (II) include, but are not limited to: ethylene oxide, propylene oxide, 1,2-epoxybutane, 1,2-epoxyhexane, 1,2-epoxydodecane, cyclohexyl oxirane, n-butyl glycidyl ether, tert-butyldimethylsilyl glycidyl ether, benzyl glycidyl ether, 10,11-epoxyundecan-1-ol, 4,5-epoxypentyl butyrate, 5,6-epoxyhexanenitrile, N,N-dimethyl-10,11-undecylamide, 1,2-epoxy-5-hexene, 1,2-epoxy-7-octene, (2,3-epoxypropyl)benzene, styrene oxide, and 1,2,7,8-diepoxyoctane, chloro-2,3-epoxypropane, 1-fluoro-2,3-epoxypropane, 1-bromo-2,3-epoxypropane, 1-chloro-2,3-epoxy butane and 1-chloro-2,3-epoxy pentane, 1,3-Butadiene diepoxide, allyl glycidyl ether, 1,4-butanediol diglycidyl ether, 1,4-butanediol diglycidyl ether, butyl glycidyl ether, tert-butyl glycidyl ether, 4-chlorophenyl glycidyl ether, 1,4-cyclohexanedimethanol diglycidyl ether, 1,2,5,6-diepoxycyclooctane, 1,2,7,8-diepoxyoctane, 2,3-epoxybutane, 3,4-epoxy-1-butene, 1,2-epoxy-5-hexene, 2,3-epoxy-2-methylbutane, 1,2-epoxy-2-methylpropane, exo-2,3-epoxynorbornane, 1,2-epoxyoctane, 1,2-epoxypentane, 1,2-epoxy-3-phenoxypropane, 1,2-epoxy-3-phenoxypropane, 1,2-epoxytetradecane, furfuryl glycidyl ether, glycidyl 2,2,3,3,4,4,5,5,6,6,7,7,8,8,9,9-hexadecafluorononyl ether, glycidyl hexadecyl ether, glycidyl isobutyl ether, glycidyl isopropyl, glycidyl 4-methoxyphenyl, glycidyl 2-methylphenyl ether, glycidyl 2,2,3,3,4,4,5,5-octafluoropentyl, glycidyl 2,2,3,3-tetrafluoropropyl, (2,2,3,3,4,4,5,5,6,6,7,7,8,8,9,9,9-heptadecafluorononyl) oxirane, (2,2,3,3,4,4,5,5,6,6,7,7,8,9,9,9-hexadecafluoro-8-(trifluoromethyl)nonyl) oxirane, isophorone oxide, methyl-1,2-cyclopentene oxide, 2-methyl-2-vinyloxirane, 2,2,3,3,4,5,5,5-octafluoro-4-(trifluoromethyl)pentyl]oxirane.

In preferred embodiments, the aminoalkoxysilane used in the method for preparing silicon-containing heterocycle of the general formula (I) has the general formula (III)

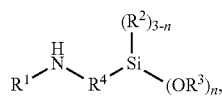

(III)

wherein, $R^1$ to $R^4$ are the same as defined for the general formula (I) above; and n is 0, 1, 2 or 3, preferably 3.

Examples of the aminoalkoxysilane include, but are not limited to: aminoalkylenealkoxysilane, such as N-cyclohexylaminomethylmethyldiethoxysilane, N-cyclohexylaminomethyltriethoxysilane, N-phenylaminomethyltrimethoxysilane, N-cyclohexyl-3-am inopropyltrimethoxysilane, 3-ureidopropyltrimethoxysilan, vinylbenzylaminoethylaminopropyltrimethoxysilane, aminoethylaminopropyltrimethoxysilane, for example, Dow Corning® Z-6121 Silane of Dow Corning, aminoethylaminopropylsilanetriol homopolymer, for example, Dow Corning® Z-6137 Silane of Dow Corning, bis(3-triethoxysilylpropyl)amine, bis(3-trimethoxysilylpropyl)amine, oligoaminosilanes, for example, Dynasylan® 1133 of Evonik, aminosilane compositions, for example, Dynasylan® 1204, Dynasylan® AMEO-T, Dynasylan® SIVO 210, Dynasylan® DAMO-M, Dynasylan® DAMO-T of Evonik, 3-aminopropylmethyldiethoxysilane, 3-aminopropylmethyldiethoxysilane formulations, for example, Dynasylan® 1506 of Evonik, 3-aminopropyltriethoxysilane, 3-aminopropyltrimethoxysilane, aqueous siloxanes, which are VOC-free (i.e. free of volatile organic compounds), for example, Dynasylan® HYDROSIL 1151, Dynasylan® HYDROSIL 2627, Dynasylan® HYDROSIL 2909, Dynasylan® HYDROSIL 2929, Dynasylan® HYDROSIL 2776 of Evonik, triaminofunctional propyltrimethoxysilanes, for example, Dynasylan® TRIAMO of Evonik, oligosiloxanes, for example, Dynasylan® 1146 of Evonik, N-(n-butyl)-3-aminopropyltrimethoxysilane, cationic benzylamino-functional silane hydrochloride, for example, Dynasylan® 1161 of Evonik, 2-aminoethyl-3-aminopropylmethyldimethoxysilane, 2-aminoethyl-3-aminopropyltrimethoxysilane, gammaaminopropyltriethoxysilane, modified aminoorganosilanes, for example, Silquest® A-1108 of Momentive Performance Materials, gamma-aminopropyltrimethoxysilane, N-beta-(aminoethyl)-gamma-aminopropyltrimethoxysilane, modified aminoorganosilanes, for example, Silquest® A-1126 or A-1128 of Momentive Performance Materials, triaminofunctional silanes, for example, Silquest® A-1130 of Momentive Performance Materials, bis-(gamma-trimethoxysilylpropyl)amine, polyazamidesilane, for example, Silquest® A-1387 of Momentive Performance Materials, delta-aminoneohexyltrimethoxysilane, N-beta-(aminoethyl)-gamma-aminopropylmethyldimethoxysilane, deltaaminoneohexylmethyldimethoxysilane, and N-phenyl-gamma-aminopropyltrimethoxysilane.

In preferred embodiments, the synthesis of the silicon-containing heterocycle of the general formula (I) may be carried out at a broad range of temperature such as from −100 to 50° C., preferably from 0 to 50° C., more preferably from 0 to 35° C., most preferably from 10 to 25° C. such as at a room temperature.

Reaction times may vary from 0.5 to 96 hours, preferably from 2 to 48 hours.

In preferred embodiments, the at least one epoxide is added in stoichiometric amounts or in an excess ranging from 1 to 200%, preferably from 10 to 100%, more preferably 50%, with respect to the amino groups of the aminoalkoxysilane(s). The unreacted epoxides are removed after the reaction using high vacuum.

In preferred embodiments, the reaction is carried out in at least one neat or in dry solvent. Examples of the solvents include, but are not limited to: toluene, acetonitrile, tetrahydrofuran, ethylene glycol, diethyl ether, dimethyl ether, benzene, ethyl acetate, isopropanol, propanol, ethanol, methanol, chloroform, chloromethane, dichloromethane, pentane, hexane, heptane, cyclohexane, isooctane, toluene, xylene, dioxane, butyl acetate, acetonitrile or dimethylformamide. Mixtures of different solvents can also be used.

The one-step reaction according to the present invention is carried out in the presence of a catalyst. Examples of the catalyst include, but are not limited to: Lewis acid or base catalysts or Brønsted-Lowry acid or base catalysts or a combination thereof. Preferably, Lewis acid catalysts, more preferably weak Lewis acid catalysts can be used.

The term "Lewis acid" as used herein refers to any electrophilic reagent that is capable of accepting an electron pair and that is not a Brønsted-Lowry acid.

The term "week Lewis acid" as used herein refers to an electron pair acceptor which forms a strong conjugate base. The acidity of a metal based Lewis acids decrease with a growing a metal radius (e. g. Al>Fe>Ca). Therefore the term weak Lewis acid is associated to the acids containing elements like Ca, Mg, Na, etc. The week Lewis acid shows a pKa value of ≤8 (Jander et al., *Maßanalyse: Theorie und Praxis der Titrationen mit chemischen und physikalischen Indikationen.* $16^{th}$ Edition. Walter de Gruyter, 2003).

In certain embodiments, the Lewis acid portion of the catalyst includes an element selected from Groups 1 to 14 of the Periodic Table or contains a lanthanide metal. Useful Lewis acids may either be neutral (e.g., compounds such as $AlCl_3$, $CrCl_2$, $CrCl_3$, $ZnCl_2$, $BF_3$, $BCl_3$, $Yb(OTf)_3$, $FeCl_2$, $FeCl_3$, $CoCl_2$, etc.) or cationic. A broad array of metallic Lewis acids have been found applicable to the present invention. In certain embodiments, metal is an alkaline earth metal of Group 2, such as magnesium, calcium, beryllium, strontium. In particular organocalcium, organomagnesium, organostrontium or organoberyllium compounds are preferred, wherein these metal catalysts comprise preferably alkoxy groups, sulfonate groups, carboxyl groups, dialkyl phosphate groups, dialkyl pyrophosphate groups and/or diketonate groups.

Particularly suitable catalyst is selected from calcium bistrifluoroacetate, calcium bisacetate, calcium bispivalate, calcium bisisobutyrane, calcium bispropionate, calcium acetate, calcium benzoate, calcium cyclohexanecarboxylate, calcium 2,2-difluoroacetate, calcium 2-fluoroacetate, calcium 2-chloroacetate, calcium methyl carbonate, magnesium bistrifluoroacetate, magnesium bisacetate, magnesium bispivalate, magnesium bisisobutyrane, magnesium bispropionate, magnesium acetate, magnesium benzoate, magnesium cyclohexanecarboxylate, magnesium 2,2-difluoroacetate, magnesium 2-fluoroacetate, magnesium 2-chloroacetate, and magnesium methyl carbonate.

Transition metals can also be used in the reaction according to the present invention. For example, in certain embodiments, the transition metal is aluminum, chromium, indium or gallium.

In certain embodiments, organotitanate is used as the catalyst. Examples of the organotitante include, but are not limited to: titanium(IV) complex compounds with two 1,3-diketonate ligands, in particular 2,4-pentane dionate (acetylacetonate), and two alcoholate ligands; titanium(IV) complex compounds with two 1,3-ketoesterate ligands, in particular ethyl acetoacetate, and two alcoholate ligands; titanium(IV) complex compounds with one or more amino alcoholate ligands, in particular triethanolamine or 2-((2-aminoethyl)amino)ethanol, and one or more alcoholate ligands; titanium(IV) complex compounds with four alcoholate ligands; as well as more highly condensed organotitanates, in particular oligomeric titanium(IV) tetrabutanolate, also referred to as polybutyl titanate; wherein, as alcoholate ligands, isobutoxy, n-butoxy, isopropoxy, ethoxy and 2-ethylhexoxy are particularly suitable. Most particularly suitable are bis(ethylacetoacetato)diisobutoxytitanium (IV), bis(ethylacetoacetato)diisopropoxytitanium (IV), bis(acetylacetonato)diisopropoxytitanium(IV), bis(acetylacetonato)diisobutoxytitanium(IV), tris(oxyethyl)amineisopropoxytitanium(IV), bis[tris(oxyethyl)amine]diisopropoxytitanium(IV), bis(2-ethythexane-1,3-dioxy)titanium(IV), tris[2-((2-aminoethyl)amino)ethoxy]ethoxytitanium(IV), bis(neopentyl(diallyl)oxydiethoxytitanium(IV), titanium(IV) tetrabutanolate, tetra-(2-ethylhexyloxy)titanate, tetra-(isopropoxy)titanate and polybutyltitanate. Particularly suitable are the commercially available types Tyzor® AA, GBA, GBO, AA-75, AA-65, AA-105, DC, BEAT, BTP, TE, TnBT, KTM, TOT, TPT or IBAY (all from Du Pont/Dorf Ketal); Tytan PBT, TET, X85, TAA, ET, S2, S4 or S6 (all from TensoChema) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Nitrogen-containing Lewis or Brønsted-Lowry bases can also be used. Examples of these catalysts include, but are not limited to: 1,4-diazabicyclo[2.2.2]octane, N,N,N',N'-tetramethyl alkylenediamines, polyoxyalkylenamines, triethylamine, tripropylamine, trimethylamine, as well as amidines, such as, in particular, 6-dibutylamino-1,8-diazabicyclo[5.4.0]undec-7-ene, 1,8-diazabicyclo[5.4.0]undec-7-ene (DBU), 1,5-diazabicyclo[4.3.0]non-5-ene (DBN); guanidines such as, in particular, tetramethylguanidine, acetylacetoneguanidine, 2-guanidinobenzimidazole, 2-tert.butyl-1,1,3,3-tetramethylguanidine, 1,3-di-o-tolylguanidine.

The catalyst can be added up to 10 mol-%, preferably from 0.01 to 10 mol-%, more preferably from 0.5 to 5 mol-%, most preferably from 1 to 2.5 mol-%, relative to the mol-% of the amine functionality of the aminoalkoxysilane.

In accordance with a second aspect of the present invention, the use of the obtained silicon-containing heterocycle of the general formula (I) as defined herein as an adhesion promoter, urethane coupling agent, end-capping agent (also called "endcappers") for moisture-curable compositions, surface treatment agent, water scavenger, fiber treatment agent, paint additive, and/or a monomer for polymer preparations.

In preferred embodiments, the silicon-containing heterocycle of the general formula (I) as defined herein is used as an end-capping agent for moisture-curable compositions, preferably coating, sealant or adhesive compositions, with good adherence properties to a wide range of substrates and with a reduced amount of alcohol production during the curing process.

Various features and embodiments of the disclosure are described in the following examples, which are intended to be representative and not limiting. The following examples serve to explain the invention, but the invention is not limited thereto.

EXAMPLES

Preparation of Calcium Bistrifluoroacetate

The following procedure is adapted from Acta Chim. Slov. 2014, 61, 67-72. In an evacuated round bottom flask under argon atmosphere 1.05 g (0.025 mol) of calcium hydride suspended in 20 ml of dry tetrahydrofuran were added. In the next step 17.1 g (0.15 mol) of trifluoroacetic acid were added slowly over the course of one hour. A milky mixture was obtained. The solvent and excess of acid was removed using vacuum. The remaining white solid was washed 3 times with diethyl ether and dried under vacuum. The title product was obtained as a white solid (4.9 g) in 74% yield.

Example 1

Preparation of N-methylcyclohexene-8,8-dimethoxy-1-oxa-4-aza-8-sila

In an evacuated round bottom flask under the argon atmosphere 1.06 g ($0.4 \times 10^{-3}$ mol) of the calcium bistrifluoroacetate obtained in Example 1 were mixed with 35.8 g (0.2 mol) of 3-aminopropyl)trimethoxysilane (Genosil GF 96 from WACKER AG) and 39.2 g (0.4 mol) of cyclohexene oxide. The reaction mixture was stirred over two days at room temperature. Then, the excess of cyclohexene oxide and the produced methanol were evaporated at 50° C. and under vacuum to obtain 48 g of a colorless liquid. The obtained liquid was analyzed by gas chromatography/mass spectrometry (GC/MS) and nuclear magnetic resonance spectroscopy (NMR). The product was obtained with 97% purity.

Example 2

Preparation of 2-methyl-8,8-dimethoxy-1-oxa-4-aza-8-sila

In an evacuated round bottom flask under argon atmosphere 1.06 g ($0.4 \times 10^{-3}$ mol) of the calcium bistrifluoroacetate obtained in Example 1 were mixed with 35.8 g (0.2 mol) of 3-aminopropyl)trimethoxysilane (Genosil GF 96 from WACKER AG) and 13.9 g of propylene oxide (0.24 mol). The reaction mixture was stirred for 48 hours at 4° C. After this time, the unreacted propylene oxide and the produced methanol were evaporated at 50° C. under vacuum to yield 39 g of a colorless liquid. The obtained liquid was analyzed by GC/MS and NMR. Analysis showed that product contains 75% of the above-mentioned silane. After distillation, 25 g of analytically pure product were obtained.

Example 3

Preparation of 2-ethyl-8,8-dimethoxy-1-oxa-4-aza-8-sila

In an evacuated round bottom flask under argon atmosphere 1.06 g ($0.4 \times 10^{-3}$ mol) of the calcium bistrifluoroacetate obtained in Example 1 were mixed with 35.8 g (0.2 mol) of 3-aminopropyl)trimethoxysilane (Genosil GF 96 from WACKER AG) and 21.6 g of 1,2-epoxybutane (0.3 mol). The reaction mixture was stirred over 48 hours at room temperature. After this time the unreacted 1,2-epoxybutane oxide and the produced methanol were evaporated under vacuum to obtain 41 g of a colorless liquid. The obtained liquid was analyzed by GC/MS and NMR. Analysis showed that product contains 80% of the above-mentioned silane. After distillation, 28 g of pure product were obtained.

Example 4

2-benzyl-8,8-dimethoxy-1-oxa-4-aza-8-sila

In an evacuated round bottom flask under argon atmosphere 1.06 g ($0.4 \times 10^{-3}$ mol) of calcium bistrifluoroacetate were mixed with 35.8 g (0.2 mol) of 3-aminopropyl) trimethoxysilane (Genosil GF 96 from WACKER AG) and 24 g of 1,2-epoxybenzene (0.2 mol). The reaction mixture was stirred for 24 hours at room temperature. After this time the unreacted, 2-epoxybenzene oxide and the produced methanol were evaporated under vacuum at 50° C. to obtain 53 g of a slightly yellow liquid. The obtained liquid was analyzed by GC/MS and NMR. Analysis showed that the product contains 95% of the above-mentioned silane.

Example 5

2-octafluoromethoxy-8,8-dimethoxy-1-oxa-4-aza-8-sila

In an evacuated round bottom flask under argon atmosphere 1.06 g ($0.4 \times 10^{-3}$ mol) of calcium bistrifluoroacetate were mixed with 35.8 g (0.2 mol) of 3-aminopropyl) trimethoxysilane (Genosil GF 96 from WACKER AG) and 54.8 g of 2,2,3,3,4,4,5,5-octafluoropentyl glycidyl ether (0.2 mol). The reaction mixture was stirred for 24 hours at room temperature. After this time the unreacted glycidyl ether and the produced methanol were evaporated under vacuum at 50° C. to obtain 84 g of a colorless liquid. The obtained liquid was analyzed by GC/MS and NMR. Analysis showed that the product contains 97% of the above-mentioned silane.

The invention claimed is:

1. A method for preparing a silicon-containing heterocycle of the general formula (I)

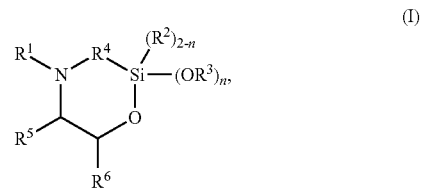

wherein $R^1$ is hydrogen;
$R^2$ and $R^3$ are same or different and are, independently from one another, selected from a linear or branched, substituted or unsubstituted $C_1$-$C_{20}$ alkyl or $C_6$-$C_{18}$ aryl residue which may be interrupted by at least one heteroatom;
$R^4$ is selected from a linear or branched, substituted or unsubstituted $C_1$-$C_{20}$ alkylene residue which may be interrupted by at least one heteroatom;
$R^5$ and $R^6$ are same or different and are, independently from one another, selected from the group consisting of hydrogen, a linear or branched, substituted or unsubstituted $C_1$-$C_{20}$ alkyl or $C_6$-$C_{18}$ aryl which may be interrupted by at least one heteroatom, and a $C_4$-$C_8$ cycloalkyl, or $R^5$ and $R^6$ may form a ring, a 4- to 8-membered alkyl ring; and
n is 0, 1 or 2, said method comprising:
providing at least one epoxide compound of the general formula (II)

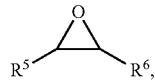
(II)

wherein $R^5$ and $R^6$ are the same as defined for the general formula (I) above;
providing at least one aminoalkoxysilane having a primary amino group;
providing a catalyst, wherein the catalyst comprises a Lewis acid selected from the group consisting of calcium bistrifluoroacetate, calcium bisacetate, calcium bispivalate, calcium bisisobutyrane, calcium bispropionate, calcium acetate, calcium benzoate, calcium cyclohexanecarboxylate, calcium 2,2-difluoroacetate, calcium 2-fluoroacetate, calcium 2-chloroacetate, calcium methyl carbonate, magnesium bistrifluoroacetate, magnesium bisacetate, magnesium bispivalate, magnesium bisisobutyrane, magnesium bispropionate, magnesium acetate, magnesium benzoate, magnesium cyclohexanecarboxylate, magnesium 2,2-difluoroacetate, magnesium 2-fluoroacetate, magnesium 2-chloroacetate, and magnesium methyl carbonate;
combining the at least one epoxide compound, the at least one aminoalkoxysilane and the catalyst to form a mixture; and
exposing the mixture to conditions suitable to react the at least one epoxide compound with the at least one aminoalkoxysilane in the presence of the catalyst to form the silicon-containing heterocycle of general formula (I).

2. The method according to claim 1, wherein the at least one epoxide is added in a stoichiometric excess ranging from 1% to 100% with respect to the amino groups of the aminoalkoxysilane(s).

3. The method according to claim 1, wherein the aminoalkoxysilane has the general formula (III)

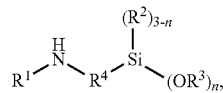
(III)

wherein $R^1$ to $R^4$ are the same as defined for the general formula (I); and n is 0, 1, 2 or 3.

4. The method according to claim 1, wherein n in the general formula (I) is 2.

5. The method according to claim 1, wherein $R^3$ is selected from a $C_1$-$C_8$ alkyl residue.

6. The method according to claim 1, wherein $R^4$ is selected from a $C_1$-$C_8$ alkylene residue.

7. The method according to claim 1, wherein $R^5$ is selected from $C_1$-$C_8$ alkyl residue and $R^6$ is selected from hydrogen, $C_1$-$C_8$ alkyl residue or a phenyl residue.

8. The method according to claim 1, wherein the reaction is carried out at a temperature in the range of from −100 to 50° C.

9. The method according to claim 1, wherein the mixture comprises up to 10 mol-% catalyst, relative to the mol-% of the amine functionality of the aminoalkoxysilane.

10. The method according to claim 1, wherein the mixture further comprises at least one solvent selected from the group consisting of toluene, acetonitrile, tetrahydrofuran, ethylene glycol, diethyl ether, dimethyl ether, benzene, ethyl acetate, isopropanol, propanol, ethanol, methanol, chloroform, chloromethane, dichloromethane, pentane, hexane, heptane, cyclohexane, isooctane, toluene, xylene, dioxane, butyl acetate, acetonitrile, and dimethylformamide mixtures thereof.

11. The method according to claim 1, further comprising the step of purifying the silicon-containing heterocycle of general formula (I).

12. The method according to claim 1, further comprising the steps of purifying and separating the silicon-containing heterocycle of general formula (I) into a product.

* * * * *

UNITED STATES PATENT AND TRADEMARK OFFICE
CERTIFICATE OF CORRECTION

PATENT NO. : 11,306,109 B2
APPLICATION NO. : 16/745609
DATED : April 19, 2022
INVENTOR(S) : Jan-Erik Damke et al.

It is certified that error appears in the above-identified patent and that said Letters Patent is hereby corrected as shown below:

In the Specification

Column 6, Line 14 change from "N-cyclohexyl-3-am inopropyltrimethoxysilane" to --N-cyclohexyl-3-aminopropyltrimethoxysilane--.

Signed and Sealed this
Twentieth Day of December, 2022

Katherine Kelly Vidal
*Director of the United States Patent and Trademark Office*